(12) United States Patent
Schuberth et al.

(10) Patent No.: US 9,156,464 B2
(45) Date of Patent: Oct. 13, 2015

(54) DRIVER ASSISTANCE SYSTEM WITH HANDS-OFF MAINTAINING OF STEERING ANGLE AND LANE KEEPING FUNCTION

(71) Applicant: Audi AG, Ingolstadt (DE)

(72) Inventors: Stefan Schuberth, Ingolstadt (DE); Alexander Breu, Weiding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/750,430

(22) Filed: Jan. 25, 2013

(65) Prior Publication Data

US 2013/0197762 A1    Aug. 1, 2013

(30) Foreign Application Priority Data

Jan. 28, 2012  (DE) .................. 10 2012 001 666

(51) Int. Cl.
- *B60W 10/20* (2006.01)
- *B62D 5/00* (2006.01)
- *B62D 6/00* (2006.01)
- *B62D 15/02* (2006.01)
- *B60W 10/18* (2012.01)

(52) U.S. Cl.
CPC ............... *B60W 10/20* (2013.01); *B60W 10/18* (2013.01); *B62D 5/008* (2013.01); *B62D 6/001* (2013.01); *B62D 6/008* (2013.01); *B62D 15/025* (2013.01); *B62D 15/0285* (2013.01)

(58) Field of Classification Search
CPC ...... B60W 10/18; B60W 10/20; B62D 5/008; B62D 6/001; B62D 6/008; B62D 15/025; B62D 15/0285

USPC ....................................................... 701/41–44
See application file for complete search history.

(56) References Cited

U.S. PATENT DOCUMENTS

| | | | |
|---|---|---|---|
| 6,070,684 A | 6/2000 | Shimizu et al. | |
| 6,082,482 A | 7/2000 | Kato et al. | |
| 6,134,491 A * | 10/2000 | Kawagoe et al. | ............... 701/43 |
| 6,186,265 B1 * | 2/2001 | Boehringer et al. | .......... 180/402 |
| 6,219,603 B1 | 4/2001 | Yamamoto et al. | |
| 6,445,151 B1 * | 9/2002 | Nakano et al. | ................... 701/41 |
| 7,510,038 B2 * | 3/2009 | Kaufmann et al. | ............. 701/41 |
| 7,568,551 B2 * | 8/2009 | Satake | ........................... 701/41 |
| 7,908,056 B2 * | 3/2011 | Hwang | ............................ 701/41 |
| 7,912,665 B2 * | 3/2011 | Deng et al. | ..................... 701/42 |
| 7,954,593 B2 | 6/2011 | Dornhege et al. | |
| 8,103,422 B2 * | 1/2012 | Bradai et al. | .................... 701/77 |
| 8,392,064 B2 * | 3/2013 | Thrun et al. | .................... 701/41 |

(Continued)

FOREIGN PATENT DOCUMENTS

| | | |
|---|---|---|
| DE | 36 10 254 A1 | 10/1987 |
| DE | 103 02 540 A1 | 8/2004 |

(Continued)

*Primary Examiner* — Helal A Algahaim
*Assistant Examiner* — Donald J Wallace
(74) *Attorney, Agent, or Firm* — Henry M. Feiereisen LLC

(57) ABSTRACT

In a method of steering a vehicle by a steering assistance system, a steering-wheel angle of a steering wheel is set by a driver. The steering assistance system checks whether the set steering-wheel angle is maintained during a predefined time period and checks whether the driver has taken the hands from the steering wheel. The vehicle is then operated according to the set steering-wheel angle, when the driver maintains the set steering-wheel angle during the predefined time period, or the steering assistance system is switched off, when the driver has released the steering wheel.

25 Claims, 3 Drawing Sheets

(56) References Cited

U.S. PATENT DOCUMENTS

| | | | |
|---|---|---|---|
| 2006/0047390 A1* | 3/2006 | Scherl et al. | 701/41 |
| 2007/0203617 A1* | 8/2007 | Haug | 701/41 |
| 2008/0091318 A1 | 4/2008 | Deng et al. | |
| 2008/0211651 A1* | 9/2008 | Beutnagel-Buchner et al. | 340/459 |
| 2008/0255727 A1 | 10/2008 | Lee | |
| 2009/0024278 A1* | 1/2009 | Kondo et al. | 701/41 |
| 2009/0271071 A1* | 10/2009 | Buerkel et al. | 701/41 |
| 2010/0131148 A1* | 5/2010 | Camhi et al. | 701/29 |
| 2010/0138112 A1* | 6/2010 | Suzuki et al. | 701/42 |
| 2010/0211264 A1* | 8/2010 | Wey et al. | 701/41 |
| 2010/0228438 A1* | 9/2010 | Buerkle et al. | 701/41 |
| 2011/0044507 A1* | 2/2011 | Strauss et al. | 382/103 |
| 2011/0273310 A1 | 11/2011 | Kadowaki et al. | |
| 2012/0018240 A1* | 1/2012 | Grubaugh et al. | 701/70 |
| 2012/0062743 A1* | 3/2012 | Lynam et al. | 348/148 |
| 2012/0239255 A1* | 9/2012 | Kojima et al. | 701/42 |
| 2012/0296528 A1* | 11/2012 | Wellhoefer et al. | 701/48 |
| 2013/0211676 A1* | 8/2013 | Benyo et al. | 701/42 |

FOREIGN PATENT DOCUMENTS

| | | |
|---|---|---|
| DE | 10 2004 027 085 A1 | 12/2005 |
| DE | 10 2004 037 960 A1 | 12/2005 |
| DE | 10 2004 057 262 A1 | 6/2006 |
| DE | 10 2005 057 251 A1 | 6/2007 |
| DE | 10 2006 025 254 A1 | 12/2007 |
| DE | 10 2007 052 258 A1 | 6/2008 |
| DE | 10 2006 044 088 B4 | 9/2009 |
| EP | 0 559 114 | 8/1993 |
| JP | 06-206553 | 7/1994 |
| JP | 2006-103581 | 4/2006 |

* cited by examiner

DRIVER ASSISTANCE SYSTEM WITH HANDS-OFF MAINTAINING OF STEERING ANGLE AND LANE KEEPING FUNCTION

CROSS-REFERENCES TO RELATED APPLICATIONS

This application claims the priority of German Patent Application, Serial No. 10 2012 001 666.2, filed Jan. 28, 2012, pursuant to 35 U.S.C. 119(a)-(d), the content of which is incorporated herein by reference in its entirety as if fully set forth herein.

BACKGROUND OF THE INVENTION

The present invention relates to a method of steering a vehicle using a steering assistance system.

The following discussion of related art is provided to assist the reader in understanding the advantages of the invention, and is not to be construed as an admission that this related art is prior art to this invention.

Various driver assist systems have been developed to simplify operation for the driver of a motor vehicle. An example includes a lane keep assistance which has a surround sensor, for example a video camera, and prevents an inadvertent crossing of a relevant lane marking that has been recognized by the sensor. The lane keep assistant provides hereby a steering-wheel torque in addition to the hand torque generated by the driver. As an alternative, or in addition, the driver is alerted before crossing the recognized lane marking by a warning signal which may be a visual, audible, or haptic warning signal.

Performance of conventional lane keep assistants is limited by the sensors so that conventional lane keep assistants, which are permanently active and enable automatic transverse guidance, have been found inadequate for useful application. In addition, concerns have been raised that a permanent automatic lane guidance could cause the driver to pay less attention to the surroundings and could distract the driver. As a result, the time for interventions by the driver would be prolonged in the event the driver has to execute a steering motion that is not detected by the lane keep assistant. Therefore, "Hands-On" solutions have been proposed which generate only a steering-wheel torque on the steering wheel so as to ensure the attentiveness of the driver with respect to the travel situation and events that happen in the surroundings.

It would be desirable and advantageous to provide an improved method of steering a vehicle by a steering assistance system to obviate prior art shortcomings.

SUMMARY OF THE INVENTION

According to one aspect of the present invention, a method of steering a vehicle by a steering assistance system includes setting a steering-wheel angle of a steering wheel via a driver, checking whether the set steering-wheel angle is maintained during a predefined time period, checking whether the driver has taken the hands from the steering wheel, and steering the vehicle in accordance with the set steering-wheel angle, when the driver maintains the set steering-wheel angle during the predefined time period, or shutting off the steering assistance system, when the driver has taken the hands from the steering wheel.

In accordance with the present invention, an actual steering-wheel angle, set by the driver, is maintained and the steering angle remains constant even when driving across bumps in the roadway. When driving at low speed, only slight steering motions are normally required, although bumps impact the steering angle. The method according to the present invention thus ensures that the actual steering angle, as set by the driver, is fixed and not altered by bumps for example. The steering angle can therefore not be changed by forces that act on the vehicle wheel. The driver is in a position to modify the steering-wheel angle at any time and to set a new steering-wheel angle which is then maintained again by the steering assistance system. The method according to the invention is, however, only activated when the actual steering-wheel angle is maintained for a specific time period or, as an alternative, in the event the driver has taken the hands from the steering wheel. In either case, the method in accordance with the present invention is able to assist the driver when steering the vehicle.

When modifying a set steering-wheel angle, the driver needs to apply only little force or slight torque to change the actually set steering-wheel angle. In the event, the driver maintains the steering wheel during a predefined time period in position or removes the hands from the steering wheel, the actually set steering-wheel angle is accepted by the steering assistance system so as to guide the vehicle and may be overridden only by the driver. This has the advantage for the driver to be able to take the hands from the steering wheel while yet not being tempted to assume an automatic transverse guidance since the method according to the invention has clearly defined system parameters.

According to another advantageous feature of the present invention, the predefined time period during which the steering-wheel angle is maintained by the driver may last 1 to 3 seconds. Currently preferred is a time period of 2 seconds. After elapse of this predefined time period, the actually set steering-wheel angle is accepted by the steering assistance system and used for steering the vehicle in transverse direction.

According to another advantageous feature of the present invention, a warning signal can be transmitted by a surround sensor to alert the driver about the presence or imminent presence of a danger situation and to prompt the driver to change the steering-wheel angle. The surround sensor may, for example, be configured as a video camera, which when perceiving a danger, for example an impending collision, outputs a warning signal to alert the driver who may then execute appropriate measures. For example, the driver may slow down the vehicle to avoid a collision.

According to another advantageous feature of the present invention, the steering assistance system can be activated only when the vehicle travels at a speed below a predefined vehicle speed, and a lane keep assistant is rendered operational, when the predefined vehicle speed is exceeded. In this way, the method according to the invention is used when the speed for a lane keep assistant is too low. In this case, the steering assistance system ensures a transverse guidance of the vehicle.

According to another advantageous feature of the present invention, lane keep assistant can be deactivated, when the vehicle travels below the predefined vehicle speed, whereas the steering assistance system is activated. The lane keep assistant and the steering assistance system are thus active alternatingly, with the steering assistance system assuming the transverse guidance of the vehicle at low vehicle speed and the lane keep assistant ensuring the directional control of the vehicle at high vehicle speed. At a specific speed threshold, a change between the lane keep assistant and the steering assistance system takes place, or vice versa.

According to another advantageous feature of the present invention, a control element can be provided for switching the steering assistance system on and off. Optionally, also the steering-wheel angle can be set or modified by the driver using the control element. In this embodiment, the steering assistance system is not automatically switched on and off; instead the steering assistance system is switched on and off by the driver. Using the control element, the driver can optionally also control the steering-wheel angle. This type of control offers an alternative to a turning of the steering wheel. As a consequence, the driver has various control options available.

According to another advantageous feature of the present invention, the steering assistance system can be rendered operative only when an automatic longitudinal guidance system is activated. Such longitudinal guidance systems, also known as ACC (Automatic Cruise Control), provide relieve for the driver, in particular when stop and go traffic is involved. The vehicle is hereby automatically controlled in longitudinal direction in dependence of other road users. The method according to the invention assists an automatic longitudinal guidance system by assuming the transverse steering of the vehicle.

According to another advantageous feature of the present invention, the activated steering assistance system can be visualized, using a display to make it easier for the driver to detect the actual state. The display enables the driver to ascertain with just one glance whether or not the steering assistance system is activated. Advantageously, the display may have a symbol, for example a steering wheel, which is "held" by a force. Depending on the state, the symbol indicated in the display may appear in different colors. For example, a standby state may be indicated in yellow and an active state may be indicated in green. When the driver is prompted to take over steering control, the color may change to red, optionally complemented by an audible signal.

According to another advantageous feature of the present invention, the steering assistance system of the vehicle can be automatically controlled within a predefined angle range of for example 5° or 10°. In this embodiment, the steering angle can be modified within this angle range, as opposed to a constant steering-wheel angle.

According to another aspect of the present invention, a motor vehicle includes a steering wheel, and a steering assistance system to monitor a steering-wheel angle set by a driver and configured to check whether the set steering-wheel angle is maintained during a predefined time period, to check whether the driver has taken the hands from the steering wheel; and to steer the vehicle in accordance with the set steering-wheel angle, when the driver maintains the set steering-wheel angle during the predefined time period, or shutting off the steering assistance system, when the driver has taken the hands from the steering wheel.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the figure is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
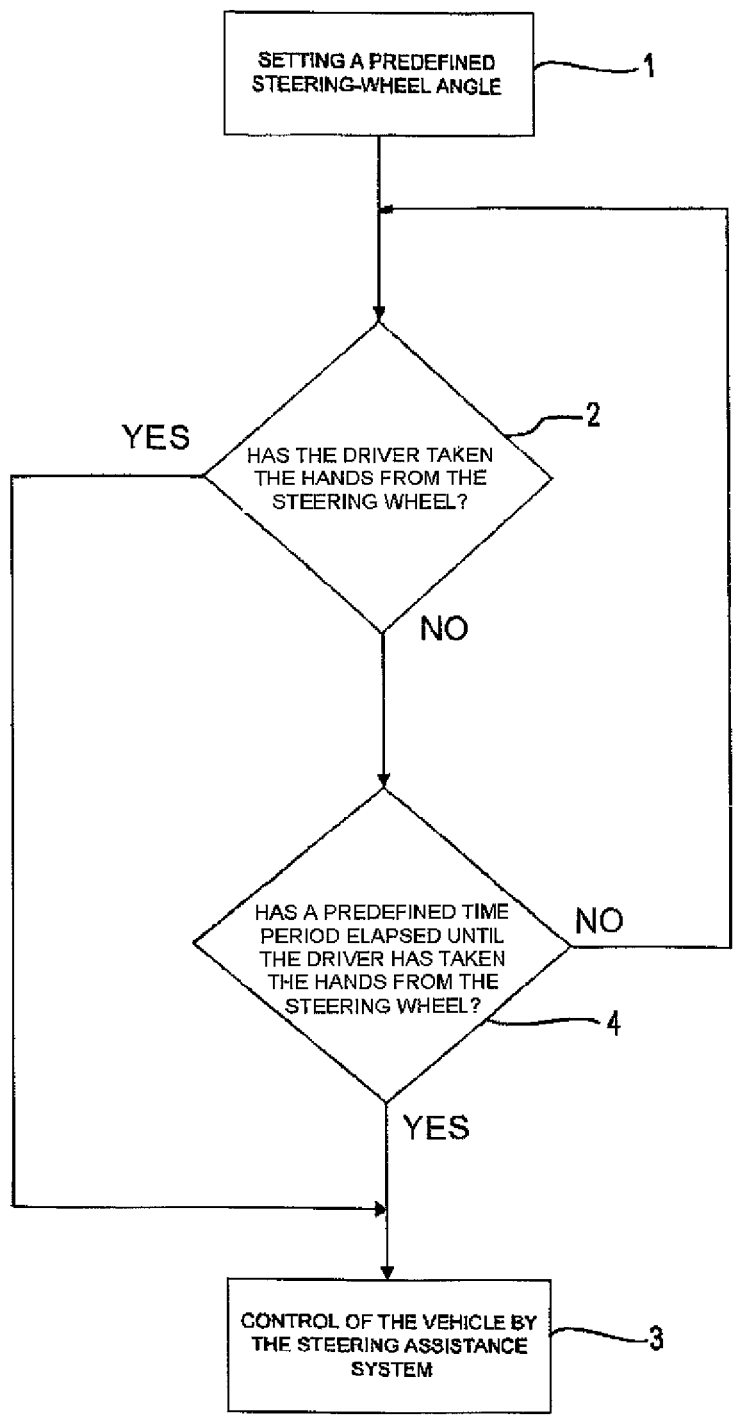
FIG. 1 shows a flow chart of a method of steering a vehicle using a steering assistance system in accordance with the present invention.
Figure 2:
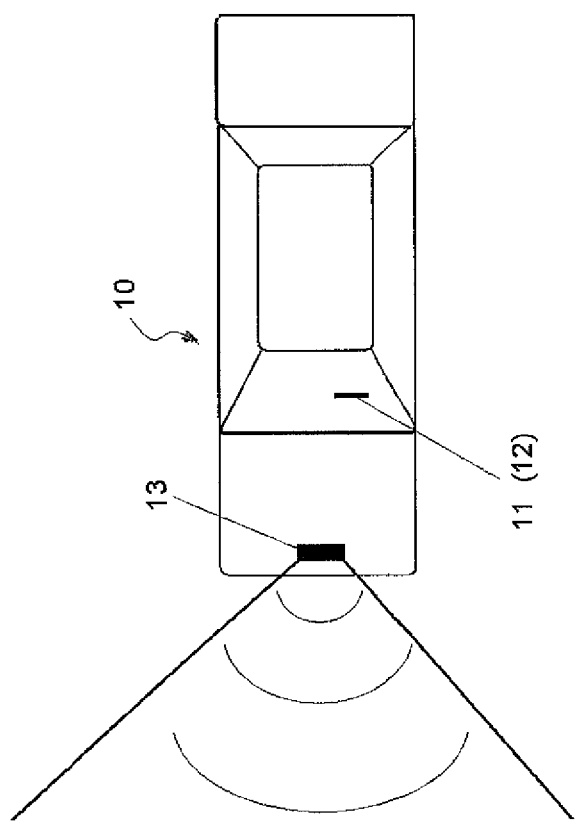
FIG. 2 is a schematic illustration of a vehicle having incorporated therein a driver assist system comprised of a steering assistance system and a lane keep assistant.

Turning now to FIG. 1, there is shown a flow chart of a method of steering a vehicle using a steering assistance system in accordance with the present invention as one type of a driver assist system. In step 1, the driver of a vehicle, generally designated by reference numeral 10 in FIG. 2, sets a specific steering-wheel angle by turning the steering wheel 11 to a desired angle position to establish the travel path.

In step 2, the steering assistance system checks whether the driver has taken the hands from the steering wheel 11. This check is executed using sensors 12 that are arranged on or in the steering wheel 11. If the outcome is affirmative (YES), the process branches off to step 3, in which the vehicle 10 is controlled by the steering assistance system in accordance with the set steering-wheel angle. The steering assistance system assumes a transverse guidance of the vehicle to move transversely as the steering-wheel angle is set by the driver.

When the query in step 2 results in a negative response (NO), i.e. the driver has not released the steering wheel 11, the steering assistance system branches off to step 4 in which it is checked whether a specific time period has elapsed until the driver has taken the hands from the steering wheel 11. This specific time period is, for example, two seconds. When the outcome of the query is YES, this means that the driver has maintained a specific steering-wheel angle for at least two seconds so that the process branches off to step 3. If, on the other hand, the outcome of this check is negative (NO), the process returns to query step 2 again, and it is checked whether the driver has taken the hands from the steering wheel 11.

In the scenarios, when the driver grasps the steering wheel 11 and keeps the steering wheel 11 in a position for no longer than the specific time period, the process does not branch to step 3 and the steering assistance system is not activated.

On the other hand, in the event one of the two conditions is met, i.e. either the driver has taken the hands from the steering wheel 11, or the specific time period has elapsed, the process branches to step 3 and the steering assistance system steers the vehicle 10 in accordance with the set steering-wheel angle which remains unchanged.

The steering assistance system ensures that the actual steering angle selected by the driver is fixed and not modified by e.g. bumps in the roadway. The steering assistance system is hereby configured in such a way that external forces that act on a wheel cannot change the steering-wheel angle. Still, the driver can at any time modify the steering-wheel angle to follow a certain roadway course. In this case, the steering assistance system is deactivated and the process for autonomous steering the vehicle 10 is terminated. Activation of the steering assistance system is implemented only when the driver no longer changes the steering-wheel angle during the predefined time period.

Once the steering assistance system is activated, the driver is able to keep the hands from the steering wheel 11 and the vehicle drives autonomously. The driver is, however, aware of the clearly defined system limitations of the steering assistance system and of the absence of an automatic transverse guidance.

The method according to the invention includes at least one surround sensor 13, configured as video camera for example. As an alternative or in addition, the surround sensor 13 may be configured, e.g. as a radar sensor or an ultrasonic sensor, capable to recognize an impending danger situation, e.g. an imminent collision with another road user or stationary object. The same applies when crossing a roadway marking. The recognition of a danger situation outputs a signal to prompt the driver to change the steering-wheel angle. The driver is thus prompted to take over steering control of the vehicle. Appropriate steering wheel sensors can be installed to detect this action by the driver. After the driver has assumed control, the steering assistance system is deactivated. The signal may be an audible signal which may be complemented by a visual signal. In the event of an impending collision, the steering assistance system is able to trigger a braking action to slow down the vehicle or even bring it to a complete standstill and thus to a safe state. Such a measure is taken when the vehicle is about to veer too much and cross the lane or when there is a risk of striking an obstacle.

The steering assistance system to maintain a fixed steering-wheel angle is intended for application only when the vehicle 10 travels at low speed because higher speeds require the driver to frequently modify the steering-wheel angle. Vehicles equipped with a lane keep assistant as another type of driver assists system alternate between the steering assistance operating mode and the lane keep operating mode at a specific speed. Thus, the steering assistance system is activated and the lane keep assistant deactivated when the travel speed is below a predefined vehicle speed whereas the lane keep assistant is activated and the steering assistance system deactivated when the predefined vehicle speed is exceeded. The predefined vehicle speed at which a change between the steering assistance operating mode and the lane keep operating mode takes place may be, e.g. 40 km/h or e.g. 60 km/h.

Figure 3:
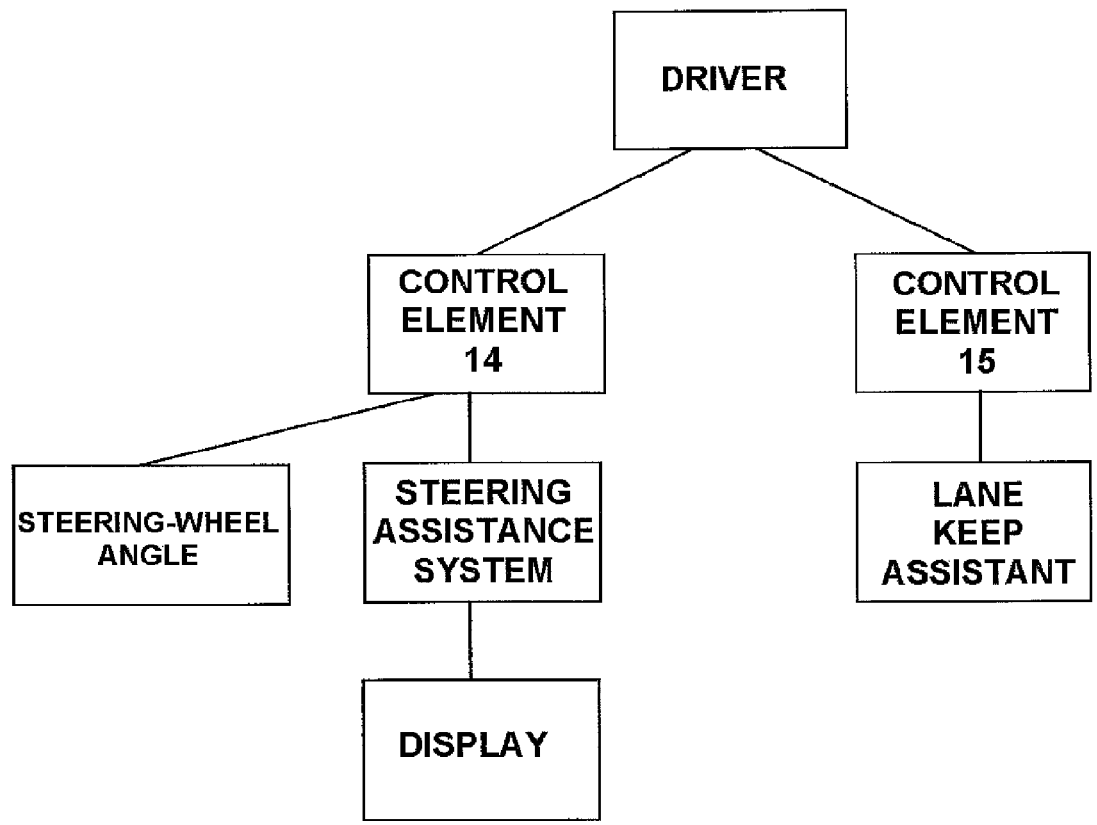
FIG. 3 is a block diagram of the driver assist system of FIG. 2.

The steering assistance system may be activated or deactivated by a control element 14 (FIG. 3) which is different from a control element 15 (FIG. 3) for the lane keep assistance. The control element 14 is configured to enable the driver to also modify a desired steering-wheel angle. Actuation of the control element 14 in one direction causes an increase of the desired steering-wheel angle by a specific angle value. Actuation of the control element 14 in opposite direction decreases the desired steering-wheel angle by a specific angle value. In this way, the driver is able to modify the desired steering-wheel angle alternatingly to the direct turning of the steering wheel also by using the control element 14.

The steering assistance system can also be combined with a traffic jam assistant. The traffic jam assistant, the lane keep assistant and the steering assistance system can be combined in such a way that a switchover from the lane keep assistant to the steering assistance system takes place only when the traffic jam assistant is active. When the traffic jam assistant is not active while the lane keep assistant is active, the steering assistance system and thus the transverse guidance is deactivated below the predefined speed to change from the lane keep operating mode to the steering assistance operating mode. Only when the traffic jam assistant is activated is the steering assistance system activated again. Activation can be initiated in the lower speed range by actuating a control element, such as a switch, which is independent from the lane keep assistant. After deactivation of the traffic jam assistant, for example by actuating the gas pedal, the steering assistance system is deactivated again. After activation of the traffic jam assistant, the steering assistance system must be re-activated again.

A separate display is provided for the steering assistance system to indicate by way of a symbol a steering wheel that is grasped by a force. The display is switched off when the steering assistance system is deactivated. In standby mode, the symbol is yellow, and in operative mode, i.e. when the steering assistance system is active, the symbol appears in green color.

Instead of a fixed predefine steering-wheel angle, it is, of course, also possible to provide a predefined angle range of 5° or 10°. The steering assistance system provides within this angle range an automatic transverse guidance. In the event, a steering-wheel angle is needed outside this range, the driver is required to again influence the trigger position of the steering wheel. As the driver knows that an adjustment beyond the angle range is not possible, he or she cannot rely on the steering assistance system and thus has to monitor the traffic situation. The trigger position of the steering wheel is indicated by a green arrow in the display. A movement of the steering wheel is visualized by a respective symbolic depiction of the steering wheel so that the momentary steering wheel position is shown. The limits of the defined angle range are indicated by red arrows so that the driver is able to correctly assess the system constraints.

It is also possible to provide a defined angle range of 10° or 20°, instead of a fixed steering-wheel angle. This expansion may be limited in time to e.g. 10 seconds or by a defined distance of e.g. 20 m after the steering assistance system is activated. Thereafter, the expanded range is reduced via a ramp. The expansion of the angle range is possible because the driver is normally alert after activation of the steering assistance system. As an alternative or in addition, the expansion of the defined angle range may also be realized in the lower speed range, e.g. between 10 km/h and 20 km/h. This expansion of the angle can be visualized to the driver in a combination instrument, for example by way of a larger green zone on a symbolically depicted steering wheel.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in, order to explain the principles of the invention and practical application to thereby enable a person skilled in the art to best utilize the invention and various embodiments with various modifications as are suited to the particular use contemplated.

What is claimed is:

1. A method of steering a vehicle by a steering assistance system, comprising:
setting a steering-wheel angle of a steering wheel via a driver;
checking whether the set steering-wheel angle is maintained during a predefined time period;
checking whether the driver has taken the hands from the steering wheel; and
steering the vehicle in accordance with the set steering-wheel angle, when the driver maintains the set steering-wheel angle during the predefined time period or has taken the hands from the steering wheel, and
shutting off the steering assistance system, when the driver has not maintained the set steering-wheel angle during the predetermined time period and has not taken the hands from the steering wheel.

2. The method of claim 1, wherein the predefined time period is 1 to 3 seconds.

3. The method of claim 1, wherein the predefined time period is 2 seconds.

4. The method of claim 1, further comprising transmitting a warning signal by a surround sensor, to alert the driver about the presence or imminent presence of a danger situation and to prompt the driver to change the steering-wheel angle.

5. The method of claim 4, wherein the warning signal is at least one of an optical signal and acoustic signal.

6. The method of claim 4, further comprising triggering a braking action to slow down the vehicle in response to the warning signal.

7. The method of claim 6, wherein the vehicle is brought to a complete stop in response to the warning signal.

8. The method of claim 1, further comprising activating the steering assistance system only when the vehicle travels at a speed below a predefined vehicle speed, and rendering a lane keep assistant operational, when the predefined vehicle speed is exceeded.

9. The method of claim 8, further comprising deactivating the lane keep assistant, when the vehicle travels below the predefined vehicle speed.

10. The method of claim 8, wherein the steering assistance system is rendered operative only when an automatic longitudinal guidance system is activated.

11. The method of claim 1, further comprising switching the steering assistance system on and off using a control element.

12. The method of claim 11, wherein the setting of the steering-wheel angle is implemented by the driver using the control element.

13. The method of claim 1, further comprising visualizing in a display the steering assistance system when activated.

14. The method of claim 1, wherein the vehicle is automatically steered by the steering assistance system within a predefined angle range, and further comprising allowing an expansion of the predefined angle range for a predefined time period or predefined distance traveled.

15. The method of claim 14, wherein the predefined angle is 5° or 10°, and the expansion of the predefined angle range is to 20° or 30°, with the predefined time period being 10 seconds and the distance traveled is 20 m.

16. A motor vehicle, comprising:
a steering wheel; and
a steering assistance system to monitor a steering-wheel angle settable by a driver and configured
to check whether the set steering-wheel angle is maintained during a predefined time period,
to check whether the driver has taken the hands from the steering wheel; and
to steer the vehicle in accordance with the set steering-wheel angle, when the driver maintains the set steering-wheel angle during the predefined time period or has taken the hands from the steering wheel, and
to shut off the steering assistance system, when the driver has not maintained the set steering-wheel angle and has not taken the hands from the steering wheel.

17. The motor vehicle of claim 16, wherein the predefined time period is 1 to 3 seconds.

18. The motor vehicle of claim 16, wherein the predefined time period is 2 seconds.

19. The motor vehicle of claim 16, further comprising a surround sensor transmitting a warning signal to alert the driver about the presence or imminent presence of a danger situation and to prompt the driver to change the steering-wheel angle.

20. The motor vehicle of claim 19, wherein the warning signal is at least one of an optical signal and acoustic signal.

21. The motor vehicle of claim 19, further comprising a brake system rendered operational to slow down the vehicle in response to a receipt of the warning signal from the surround sensor.

22. The motor vehicle of claim 16, wherein the steering assistance system is activated only when the vehicle travels at a speed below a predefined vehicle speed, and further comprising a lane keep assistant rendered operational, when the predefined vehicle speed is exceeded.

23. The motor vehicle of claim 16, further comprising a control element to switch the steering assistance system on and off.

24. The motor vehicle of claim 23, wherein the control element is actuated by the driver to set the steering-wheel angle.

25. The motor vehicle of claim 16, further comprising a display to visualize the steering assistance system when activated.

* * * * *